United States Patent
Li et al.

(10) Patent No.: US 12,457,325 B2
(45) Date of Patent: Oct. 28, 2025

(54) ON PLANAR INTRA PREDICTION MODE

(71) Applicant: Alibaba (China) Co., Ltd., Hangzhou (CN)

(72) Inventors: Xinwei Li, Beijing (CN); Ru-Ling Liao, Beijing (CN); Jie Chen, Beijing (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 19 days.

(21) Appl. No.: 18/217,429

(22) Filed: Jun. 30, 2023

(65) Prior Publication Data

US 2024/0007640 A1  Jan. 4, 2024

Related U.S. Application Data

(60) Provisional application No. 63/358,208, filed on Jul. 4, 2022.

(51) Int. Cl.
| | |
|---|---|
| *H04N 19/105* | (2014.01) |
| *H04N 19/159* | (2014.01) |
| *H04N 19/176* | (2014.01) |
| *H04N 19/46* | (2014.01) |
| *H04N 19/593* | (2014.01) |
| *H04N 19/70* | (2014.01) |

(52) U.S. Cl.
CPC ......... *H04N 19/105* (2014.11); *H04N 19/159* (2014.11); *H04N 19/176* (2014.11); *H04N 19/46* (2014.11); *H04N 19/593* (2014.11); *H04N 19/70* (2014.11)

(58) Field of Classification Search
CPC .. H04N 19/132; H04N 19/105; H04N 19/176; H04N 19/46; H04N 19/70; H04N 19/11; H04N 19/117; H04N 19/593
See application file for complete search history.

(56) References Cited

U.S. PATENT DOCUMENTS

| | | | |
|---|---|---|---|
| 2017/0230673 A1 | 8/2017 | He | |
| 2017/0302962 A1* | 10/2017 | Shen | ............... H04N 19/14 |
| 2020/0014922 A1 | 1/2020 | Ramasubramonian et al. | |
| 2020/0304806 A1 | 9/2020 | Zhao et al. | |
| 2022/0021871 A1* | 1/2022 | Racape | ............... H04N 19/593 |
| 2022/0201281 A1* | 6/2022 | Li | ............... H04N 19/176 |
| 2022/0210470 A1 | 6/2022 | Lin et al. | |

(Continued)

FOREIGN PATENT DOCUMENTS

CN          114501000 A      5/2022

OTHER PUBLICATIONS

International Search Report mailed Sep. 19, 2023, from PCT/CN2023/105671, 3 pages.

(Continued)

*Primary Examiner* — Francis Geroleo
(74) *Attorney, Agent, or Firm* — Lee & Hayes, P.C.

(57) ABSTRACT

An input video or video stream may be obtained or received. The input video or video stream may include a plurality of video frames, and each frame may be divided into a plurality of blocks. A current block of the plurality of blocks may be predicted using a planar mode. Depending on which planar mode is used, different reference samples may be used for predicting a current sample in the current block.

20 Claims, 7 Drawing Sheets

(56) References Cited

U.S. PATENT DOCUMENTS

2022/0345701 A1\* 10/2022 Yang .................. H04N 19/82
2024/0323423 A1\* 9/2024 Xu .................... H04N 19/44

OTHER PUBLICATIONS

Rath et al., "JVET-O0224: CE3-related: Further simplifications of the unified MPM list for intra mode coding" Joing Video Experts Team (JVET) of ITU-T SG 16 WP 3 and ISO-IEC JTC 1/SC 29/WG 11 5th Meeting: Gothenburg, SE, Jul. 3-12, 2019, Jul. 12, 2019 (Jul. 12, 2019), 4 pages.

Written Opinion mailed Sep. 19, 2023, from PCT/CN2023/105671, 3 pages.

\* cited by examiner

ON PLANAR INTRA PREDICTION MODE

CROSS REFERENCE TO RELATED PATENT APPLICATION

This application claims the benefit of U.S. Provisional Patent Application No. 63/358,208, entitled "On Planar Intra Prediction Mode" and filed Jul. 4, 2022, which is expressly incorporated herein by reference in its entirety.

BACKGROUND

The Joint Video Experts Team (JVET) of the ITU-T Video Coding Expert Group (ITU-T VCEG) and the ISO/IEC Moving Picture Expert Group (ISO/IEC MPEG) have developed a Versatile Video Coding (VVC/H.266) standard. Such VVC standard is aimed at doubling the compression efficiency of its predecessor, i.e., the High Efficiency Video Coding (HEVC/H.265) standard. In other words, one of the goals of VVC is to achieve the same or substantially the same subjective quality as that of HEVC/H.265 using half the bandwidth.

In order to achieve this goal, since 2015, the JVET has been developing technologies beyond HEVC using joint exploration model (JEM) reference software. As coding technologies are incorporated into the JEM, the JEM can achieve a coding performance substantially higher than that of HEVC. In October 2017, a joint call for proposals (CfP) was issued by VCEG and MPEG to formally start the development of next generation video compression standard beyond HEVC. Responses to the CfP have been evaluated at a JVET meeting in San Diego in April 2018, and a formal development process of the VVC standard has started in April 2018.

BRIEF DESCRIPTION OF THE DRAWINGS

The detailed description is set forth with reference to the accompanying figures. In the figures, the left-most digit(s) of a reference number identifies the figure. in which the reference number first appears. The use of the same reference numbers in different figures indicates similar or identical items.

DETAILED DESCRIPTION

Figure 1:
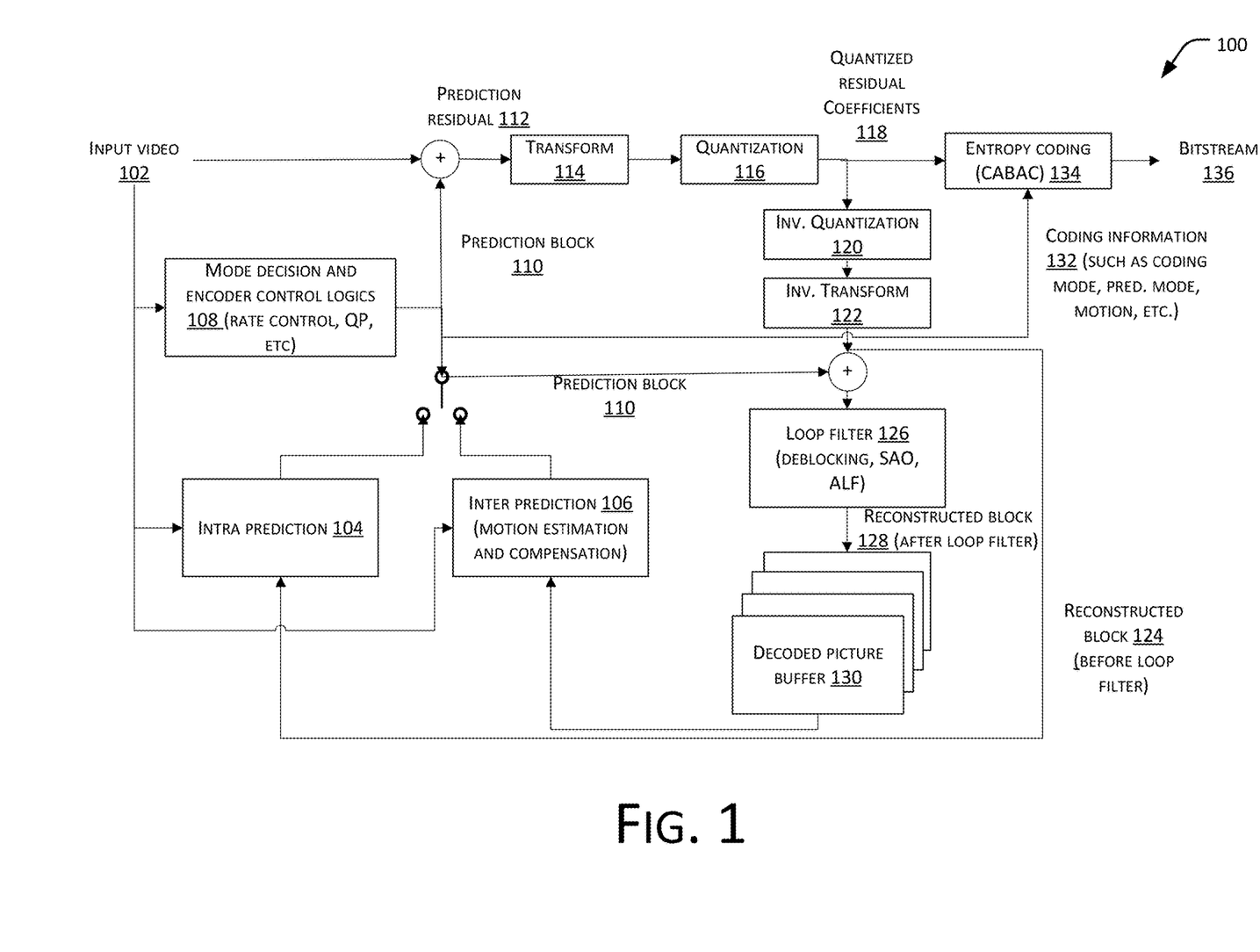
FIG. 1 illustrates an encoder block diagram of an example hybrid video coding system.

The VVC standard has been formally developed since April 2018, and continues to include more coding technologies that can provide better compression performance. In example implementations, the VVC may be constructed based on the same hybrid video coding system that has been used in other modern video compression standards such as HEVC, H.264/AVC, MPEG2, H.263, etc. FIG. 1 shows an encoder block diagram of an example hybrid video coding system 100. An input video 102 may be processed block by block. In example implementations, the hybrid video coding system 100 may divide a picture or image of the input video 102 into macroblocks ("MBs"), each having predefined dimensions (such as N×N pixels, where N is a positive integer), and divide or partition each macroblock into a plurality partitions.

By way of example and not limitation, the hybrid video coding system 100 may divide a picture or image of the input video 102 into coding tree units (CTUs). A coded tree unit (CTU) may be defined as the largest block unit in VVC, and may be as large as 128×128 luma samples (plus corresponding chroma samples depending on a chroma format that is used). In example implementations, a CTU may be further partitioned into coding units (CUs) using a quad-tree, binary tree, or ternary tree. In alternative implementations, the hybrid video coding system 100 may divide a picture into units of N×N pixels, which may then be further subdivided into subunits. Each of these largest subdivided units of a picture may generally be referred to as a "block" for the purpose of the present disclosure. In example implementations, a CU is coded using one block of luma samples and two corresponding blocks of chroma samples, where pictures are not monochrome and are coded using one coding tree.

In example implementations, at the leaf nodes of such partitioning structure, coding information such as a coding mode (e.g., intra mode or inter mode, etc.), motion information (such as a reference index, motion vectors, etc.) if inter coded, and quantized residual coefficients may be stored and/or sent. In example implementations, if intra prediction 104 (which may also be called as spatial prediction) is used, spatial neighboring samples may be used to predict a current block to be coded. In example implementations, if inter prediction 106 (which may also be called as temporal prediction or motion compensated prediction) is used, samples from already coded pictures (i.e., reference pictures) may be used to predict the current block. In example implementations, different prediction methods may be used for inter prediction, which include, but are not limited to uni-prediction, bi-prediction, etc. In example implementations, if uni-prediction is used, only one motion vector pointing to one reference picture is used to generate a predictor for the current block. In example implementations, if bi-prediction is used, two motion vectors, with each pointing to its corresponding reference picture, are used to generate a predictor for the current block. In example implementations, motion vectors and reference indices may be sent to a decoder to identify where predictor(s) of the current block come(s) from.

After intra or inter prediction is performed, a mode decision and encoder control block 108 may select or determine a particular prediction mode (such as the best prediction mode, etc.) for the current block, for example, based on a rate-distortion optimization method or other mode selection methods. In example implementations, after the best prediction mode is selected, a prediction block 110 may be generated based on the best prediction mode, and subtracted from the input video block.

In example implementations, a prediction residual 112, i.e., a difference between the input video block and the prediction block, may be sent to a transform module 114 and a quantization module 116 to generate quantized residual coefficients 118. In example implementations, based on the prediction residual, the transform module 114 may perform a transform operation on the residual by a matrix arithmetic operation to derive an array of coefficients (which can be referred to as "residual coefficients," "transform coefficients," and the like), thereby encoding the current block as a transform block ("TB"). In example implementations, the transform coefficients may refer to coefficients representing one of several spatial transformations, such as a diagonal flip, a vertical flip, or a rotation, which may be applied to a sub-block. In example implementations, the quantization module 116 may perform a quantization operation on the residual coefficients by a matrix arithmetic operation, based on a quantization matrix and assigned quantization parameters (QP). Residual coefficients falling within an interval are kept, and residual coefficients falling outside the interval step are discarded.

In example, implementations, the quantized residual coefficients may then be inverse quantized 120 and inverse transformed 122 to obtain a reconstructed residual. For example, an inverse quantization operation and an inverse transform operation may be performed on the quantized residual coefficients, by matrix arithmetic operations which are the inverse of the quantization operation and transform operation as described above. The inverse quantization operation and the inverse transform operation yield a reconstructed residual. For example, the prediction block and the reconstructed residual may be added together to form a reconstructed block 124 before loop filtering, which may be used to provide reference samples for intra prediction. Loop filtering 126, such as deblocking, sample adaptive offset (SAO), and adaptive loop filter (ALF), etc., may be applied to the reconstructed block to form a new reconstructed block 128 after loop filtering, which may then be stored in a decoded picture buffer 130, and used to provide reference samples for inter prediction. In example implementations, coding information 132, such as a coding mode (e.g., intra or inter prediction, etc.), an intra prediction mode, motion information, quantized residual coefficients, etc., may be sent to an entropy coding module 134 to further reduce the bit rate before being packed into an output video bitstream.

Figure 2:
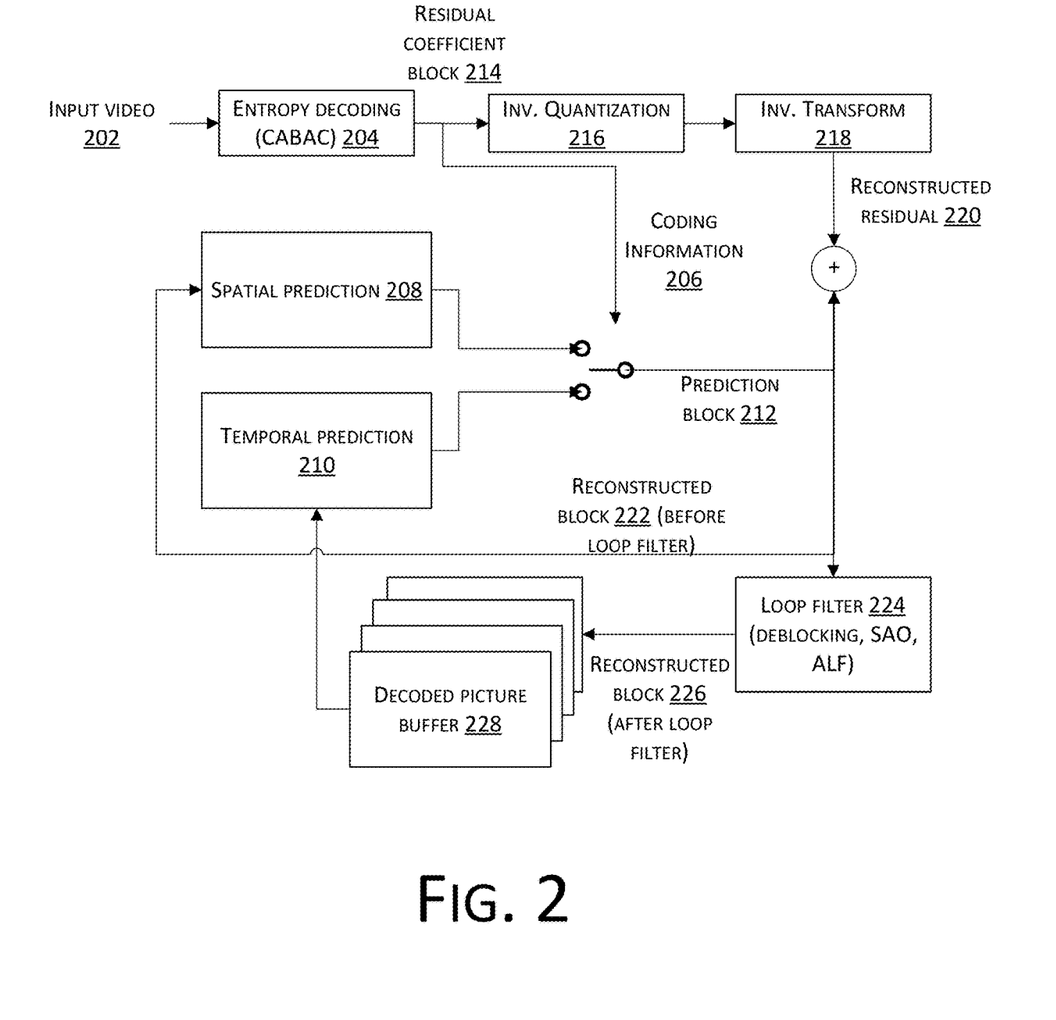
FIG. 2 illustrates a decoder block diagram of an example hybrid video coding system.

FIG. 2 shows a decoder block diagram of an example hybrid video coding system 200. In example implementations, a video bitstream or input video 202 may be unpacked and entropy decoded by an entropy decoding module 204. For example, the entropy decoding module 204 may perform entropy decoding and output quantized residual coefficients, wherein, according to CABAC, bins are decoded by reversing the mappings of symbols to bins, thereby recovering the entropy-coded quantized residual coefficients. In example implementations, coding information 206 (such as a coding mode, prediction information, motion information if motion prediction has been used for encoding, etc.) may be obtained after unpacking and decoding by the entropy decoding module 204. In example implementations, the coding mode may be used to select whether a spatial prediction module 208 (or called intra prediction module) or a temporal prediction module 210 (or called motion compensated prediction module) is to be invoked or called. In example implementations, prediction information obtained after unpacking and decoding may then be sent to an appropriate prediction module (i.e., the spatial prediction module 208 or the temporal prediction module 210, for example) to generate a predictor 212 (or prediction block in the figure). In example implementations, quantized residual coefficients 214 obtained after unpacking and decoding may be sent to an inverse quantization module 216 and an inverse transform module 218 to obtain a reconstructed residual 220. By way of example and not limitation, the inverse quantization module 216 and the inverse transform module 218 may perform an inverse quantization operation and an inverse transform operation on the decoded quantized residual coefficients respectively and successively, by matrix arithmetic operations which are the inverse of the quantization operation and transform operation as described above.

In example implementations, the inverse quantization operation and the inverse transform operation may yield a reconstructed residual. For example, the predictor 212 and the reconstructed residual 220 may be added together to form a reconstructed block 222 before loop filtering. A loop filter 224, such as deblocking, SAO and/or ALF, etc., may be applied to form a new reconstructed block 226 after loop filtering, which may then be stored in a decoded picture buffer (DPB) 228 for prediction of future or subsequent pictures. Reconstructed pictures stored in the DPB may also be sent to a display, such as a TV, a PC, a smartphone or a tablet for presentation to an end-user.

In example implementations, multiple intra prediction modes may be provided in VVC.

Figure 3:
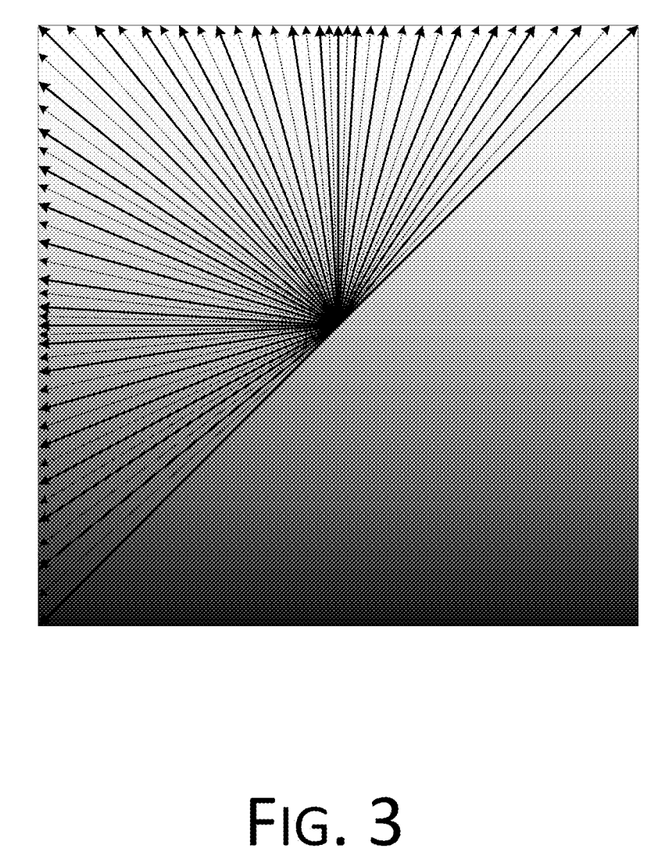
FIG. 3 illustrates example angular intra prediction modes.

In example implementations, as shown in FIG. 3, to capture arbitrary edge directions presented in a natural video, the number of angular intra prediction modes in VVC may be extended to a predefined number, depending on requirements set forth in the VVC standard. By way of example and not limitation, the number of angular intra prediction modes in VVC may be extended from 33 as used in HEVC to a higher number (such as 65 as exemplified in FIG. 3), wherein angular modes not in HEVC are depicted as dotted arrows. In this example, the 65 angular intra prediction modes from bottom left to top right may be represented using indices 2 to 66.

In example implementations, for blocks having a square shape, an equal number of angular modes may be assigned to the top and left sides of a block as shown in FIG. 3. On the other hand, for intra blocks of a rectangular shape, which are not present in HEVC but are a central part of VVC's partitioning scheme, more intra prediction directions may be assigned to the longer side of a block. The additional modes allocated along a longer side may be called Wide-Angle Intra Prediction (WAIP) modes, since these additional modes correspond to prediction directions with angles greater than 45 degrees relative to the horizontal or vertical mode. For a given rectangular block, an aspect ratio, i.e., a ratio of width to height, may be used to determine which angular modes are to be replaced by corresponding WAIP modes These WAIP modes may be represented using indices, such as indices −14 to −1 and 67 to 80, for example.

In example implementations, the VVC standard may also implement one or more non-angular intra prediction modes, which may include, but are not limited to, a DC mode and a planar mode (as in HEVC).

In example implementations, in the DC intra prediction mode (or simply called as the DC mode), a mean sample value of reference samples to a current block to be coded may be used for prediction generation. In example implementations, in VVC, only reference samples along a longer side of a rectangular block may be used to calculate a mean value, while reference samples from both left and upper (or above) sides of a square block may be used to calculate a mean value.

Figure 4:
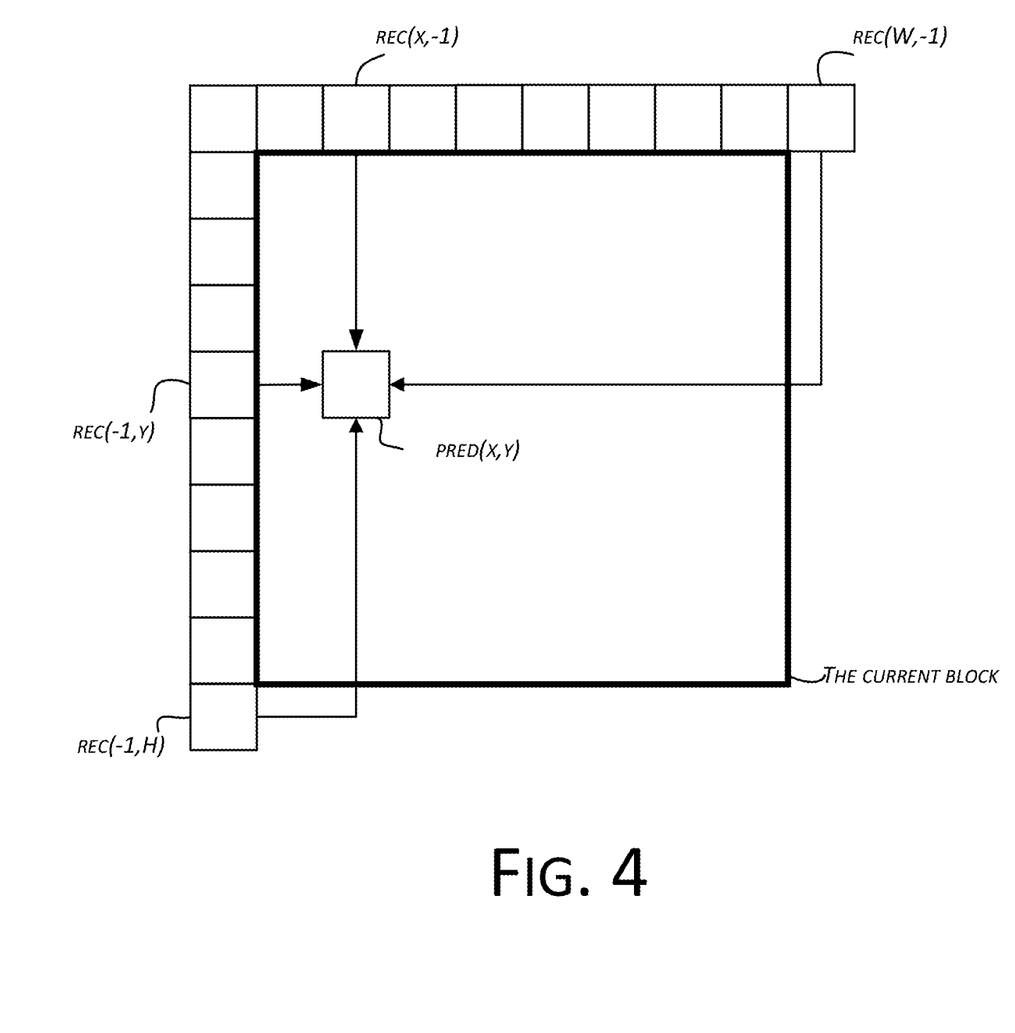
FIG. 4 illustrates example reference samples that are used in a planar mode.

In the planar intra prediction mode (or simply called as the planar mode), a predicted value of a current sample may be obtained from reconstructed values of a predefined number of reference samples (for example, 4 reference samples). For example, if 4 reference samples are used for determining the predicted value of the current sample, these 4 reference samples may include the left reference sample in the same row as the current sample, the upper (or above) reference sample in the same column as the current sample, the reference sample at the bottom-left position adjacent to the current block and the reference sample at the top-right position adjacent to the current block. Following the above example, if pred (x, y) is used to represent the predicted value of the current sample, H is used to represent the height of the current block, and W is used to represent the width of the current block, then the reconstructed values of these four reference samples used in the planar mode in this example may be respectively represented as rec (−1, y), rec (x,−1), rec (−1, H) and rec (W,−1), which are shown in FIG. 4, where (x, y) represents coordinate information of the current sample relative to the top-left position within the current block.

Continuing the above example of using 4 reference samples, in example implementations, the planar mode may generate the predicted value of the current sample according to the following three equations, namely, Equations (1)-(3). In example implementations, an intermediate value predV (x, y) may be obtained from rec(x, −1) and rec(−1, H) according to Equation (1), and another intermediate value predH(x, y) may be obtained from rec(−1, y) and rec(W, −1) based on Equation (2). Based on these two intermediate values, the predicted value of the current sample may be generated according to Equation (3).

$$predV(x,y)=((H-1-y)*rec(x,-1)+(y+1)*rec(-1,H))<<\log_2 W \quad (1)$$

$$predH(x,y)=((W-1-x)*rec(-1,y)+(x+1)*rec(W,-1))<<\log_2 H \quad (2)$$

$$pred(x,y)=(predV(x,y)+predH(x,y)+W*H)>>(\log_2 W+\log_2 H+1) \quad (3)$$

In example implementations, a prediction process of the planar mode may include the following process: setting values of all reference samples in the right column to be the same as a reconstructed value of a reference sample on the top-right position adjacent to a current block, i.e., rec(W, −1), and setting values of all reference samples in the bottom row to be the same as a value of a reference sample on the bottom-left position adjacent to the current block, i.e., rec(−1, H); generating a vertical predictor by linearly interpolating reconstructed values of the top and bottom reference samples of the current sample, i.e., rec(x, −1) and rec(−1, H); generating a horizontal predictor by linearly interpolating reconstructed values of left and right reference samples of the current sample, i.e., rec(−1, y) and rec(W, −1); and performing weighted averaging on the horizontal predictor and the vertical predictor to obtain a predicted value of the current sample.

In example implementations, reference samples used for intra prediction may be obtained from reconstructed values of neighboring samples of the current block. In some scenarios (such as current samples being located at the edge or corner of the current block), not all reference samples may be available, i.e., located at already reconstructed sample positions. In this case, unavailable reference samples may be generated by a padding mechanism. In example implementations, determining the availability of reference samples may be performed based at least in part on a n by n units or a n×n window of neighboring reconstructed samples, where n can be any predefined integer, such as 2, 4, 6, depending on the availability of the neighboring reconstructed samples, the computational or graphic processing power of a processor responsible for performing this determination, etc. In example implementations, a set of available units may form a contiguous interval of a subset of the reference samples, and outermost reconstructed samples of this interval may then be used as values for corresponding unavailable parts of the reference samples.

In example implementations, the reference samples obtained from reconstructed values of neighboring samples may be filtered to generate final reference samples that may be used for intra prediction. In example implementations, different filtering mechanisms may be applied to the reference samples. In example implementations, the different filtering mechanisms may include, but are not limited to, reference sample smoothing, and interpolation filtering, etc. In example implementations, one (or only one) of these two mechanisms may be applied on a given block in order to avoid a latency increase that would be caused by a sequential application of two filtering operations. In example implementations, if a faster processor or a fast dedicated graphic processor is employed, more than one filtering mechanism may be applied. For a planar mode, reference sample smoothing may be performed when the number of samples in the current block is more than a predefined number, such as 32, etc., or no filtering is performed. In reference sample smoothing, reference samples may be filtered using a preset filter. In example implementations, the preset filter may include, but is not limited to, a finite impulse response filter such as {1,2,1}/4, for example.

In example implementations, the VVC standard may implement a direct mode (DM) for chroma intra prediction, wherein an intra prediction mode of a corresponding luma block may determine a chroma intra mode.

In example implementations, a most probable mode list (MPM) may further be implemented for VVC. Continuing the above example of 67 intra prediction modes in VVC as shown in FIG. 3, if the prediction mode of each block is signaled separately, 7 bits may be required. In example implementations, a method of constructing a MPM list may be adopted in VVC. In image and video coding, adjacent blocks usually have strong correlation, and so there may be a relatively high probability that intra prediction modes of adjacent blocks are the same or similar. In example implementations, the MPM list may be constructed based on intra prediction modes of a left adjacent block and an upper (or above) adjacent block. Using the above example, in VVC, the length of its MPM list may be 6. In example implementations, in order to keep a low complexity of the MPM list generation, an intra prediction mode coding method with a number of MPMs (e.g., 6 MPMs in this example), which is derived from two available neighboring intra prediction modes, may be used.

In example implementations, a unified k-MPM list (a unified 6-MPM list in this example), which is also referred to as a primary MPM (PMPM) list, may be used for intra blocks irrespective of whether MRL (Multiple Reference Line) and ISP (Intra Sub-Partitions) coding tools may be applied. In example implementations, the MPM list may be constructed based on intra prediction modes of left and upper neighboring blocks. In example implementations, if the intra prediction mode of the left block is denoted as "Left" and the intra prediction mode of the upper block is denoted as "Above." In example implementations, when a neighboring block is not available, the intra prediction mode of that block may be set as the planar mode by default, and then the MPM list (such as the unified 6-MPM list in this example) may be constructed as follows.

In example implementations, if both modes Left and Above are non-angular modes, the MPM list may be set as {Planar, DC, V, H, V−4, V+4}, wherein V is referred to an index of a vertical mode, and H is referred to an index of a horizontal mode. If one of Left and Above is an angular mode, and the other is non-angular, a mode, Max, may be set as the mode with a larger index in Left and Above, and the MPM list may be set as {Planar, Max, Max−1, Max+1, Max−2, Max+2}. If Left and Above are both angular and are different, a mode, Max, may be as the mode with a larger index in Left and Above, and a mode, Min, may be set as the mode with a smaller index in Left and Above. If Max-Min is equal to 1, the MPM list is set as {Planar, Left, Above, Min−1, Max+1, Min−2}. Otherwise, if Max-Min is greater than or equal to a predefined number (such as 62 in this example), the MPM list may be set to {Planar, Left, Above, Min+1, Max−1, Min+2}. If Max-Min is equal to 2, the MPM list may be set as {Planar, Left, Above, Min+1, Min−1, Max+1}. Otherwise, the MPM list may be set as {Planar, Left, Above, Min−1, Min+1, Max−1}. If Left and Above are both angular and are the same, the MPM list may be set to {Planar, Left, Left−1, Left+1, Left−2, Left+2}.

In example implementations, context-based coding may be used to contextually code the first bin of a MPM index code word. Examples of context-based coding may include, but are not limited to, CABAC (Context-based Adaptive Binary Arithmetic Coding), CAVLC (Context-based Variable-Length Coding), etc. In example implementations, a predefined number of contexts may be used. For example, continuing the above example, 3 contexts corresponding to whether a current intra block is MRL enabled, ISP enabled, or a normal intra block, may be used. In example implementations, for entropy coding of non-MPM modes (such as 61 non-MPM modes in the above example), a TBC (Truncated Binary Code) may be used.

Figure 5:
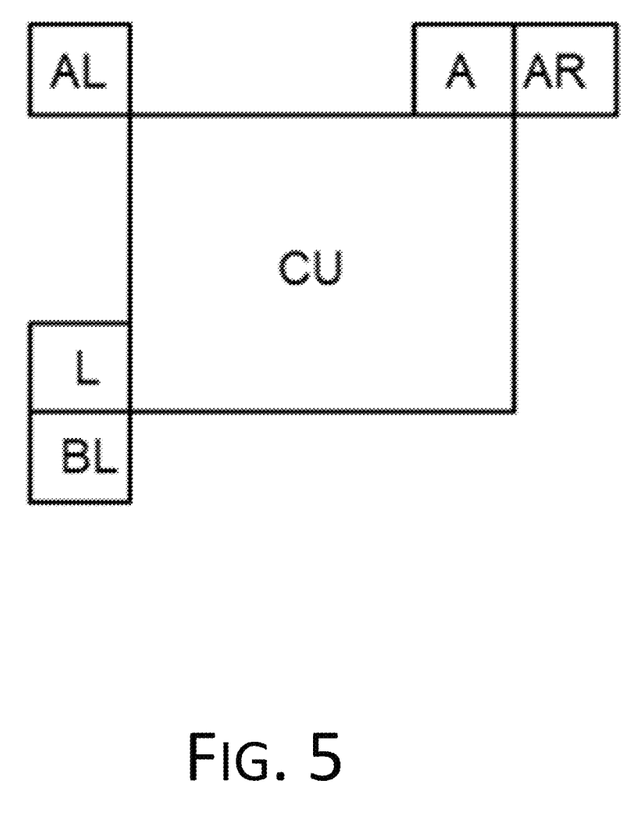
FIG. 5 illustrates example neighboring blocks used in a derivation of a general MPM list.

In example implementations, a secondary MPM method can be used in ECM. In example implementations, a primary MPM (PMPM) list may include a first predefined number of entries (such as 6 entries in this example), and a secondary MPM (SMPM) list may include a second predefined number of entries (such as 16 entries in this example). In example implementations, a general MPM list with a third predetermined number of entries (i.e., a total of the first and second predefined numbers of entries, for example, 22 entries in this example) may first be constructed, of which the first few entries (e.g., the first predetermined number of entries) may be included into the PMPM list, and the remaining entries may form the SMPM list. In example implementations, the first entry in the general MPM list may be the Planar mode. In example implementations, intra prediction modes of neighboring blocks may then be added into the general MPM list. FIG. 5 illustrates exemplary neighboring blocks used in a derivation of a general MPM list according to example implementations of the present disclosure. As shown in FIG. 5, intra prediction modes of the left (L), above (A), below-left (BL), above-right (AR), and above-left (AL) neighboring blocks may be used. In this example, if a block is vertically oriented, an order of neighboring blocks may be A, L, BL, AR, AL. Otherwise, if the block is horizontally oriented, the order of neighboring blocks may be L, A, BL, AR, AL. In example implementations, two decoder-side intra prediction modes may be added into the general MPM list. In example implementations, derived angular modes obtained by adding offset from the first two available angular modes of the general MPM list may be added into the general MPM list. In example implementations, if the general MPM list is not complete, default modes may be added until the general MPM list is complete, i.e., the third predetermined number of entries is reached (or 22 entries in this example). Continuing to use the above example, a default mode list may be defined as {DC, V, H, V−4, V+4, 14, 22, 42, 58, 10, 26, 38, 62, 6, 30, 34, 66, 2, 48, 52, 16}, according to example implementations of the present disclosure.

In example implementations, a PMPM flag may be parsed first. In example implementations, if the PMPM flag equal to a predefined value (e.g., 1), a PMPM index may then be parsed to determine which entry of the PMPM list is selected. Otherwise a SPMPM flag is parsed to determine whether to parse a SMPM index or remaining modes.

In example implementations, in VVC, the results of intra prediction can be further modified or refined. By way of example and not limitation, a position dependent intra prediction combination (PDPC) method or like may be used to modify or refine the results of intra prediction. In example implementations, PDPC may be applied to the following intra prediction modes without signaling: a planar mode, a DC mode, an intra angular mode with index less than or equal to the index of horizontal mode, and an intra angular mode with index greater than or equal to the index of vertical mode.

In example implementations, for the planar mode, the predicted value of the current sample can be further modified using the following Equation (4):

$$\text{pred}'(x,y)=\text{clip}(wT*\text{rec}(x,-1)+wL*\text{rec}(-1,y)+(64-wT-wL)*\text{pred}(x,y)+32)>>6 \quad (4)$$

where pred(x, y) represents a predicted value of a current sample obtained by the planar prediction process, rec(x, −1) represents a value of a neighbouring sample in the same column of the current sample, rec(−1, y) represents a value of a neighbouring sample in the same row of the current sample, pred'(x, y) represents a modified predicted value of the current sample obtained by the PDPC method which is clipped to a range of 0 to 1<<bitDepth, and wT and wL are two weights which can be calculated using the following Equation (5) and Equation (6) respectively:

$$wT=32>>((y<<1)>>n\text{Scale}) \quad (5)$$

$$wL=32>>((x<<1)>>n\text{Scale}) \quad (6)$$

where nScale is related to the width W and height H of the current block, and is calculated based on the following Equation (7):

$$n\text{Scale}=(\log_2 W+\log_2 H-2)>>2 \quad (7)$$

Figure 6:
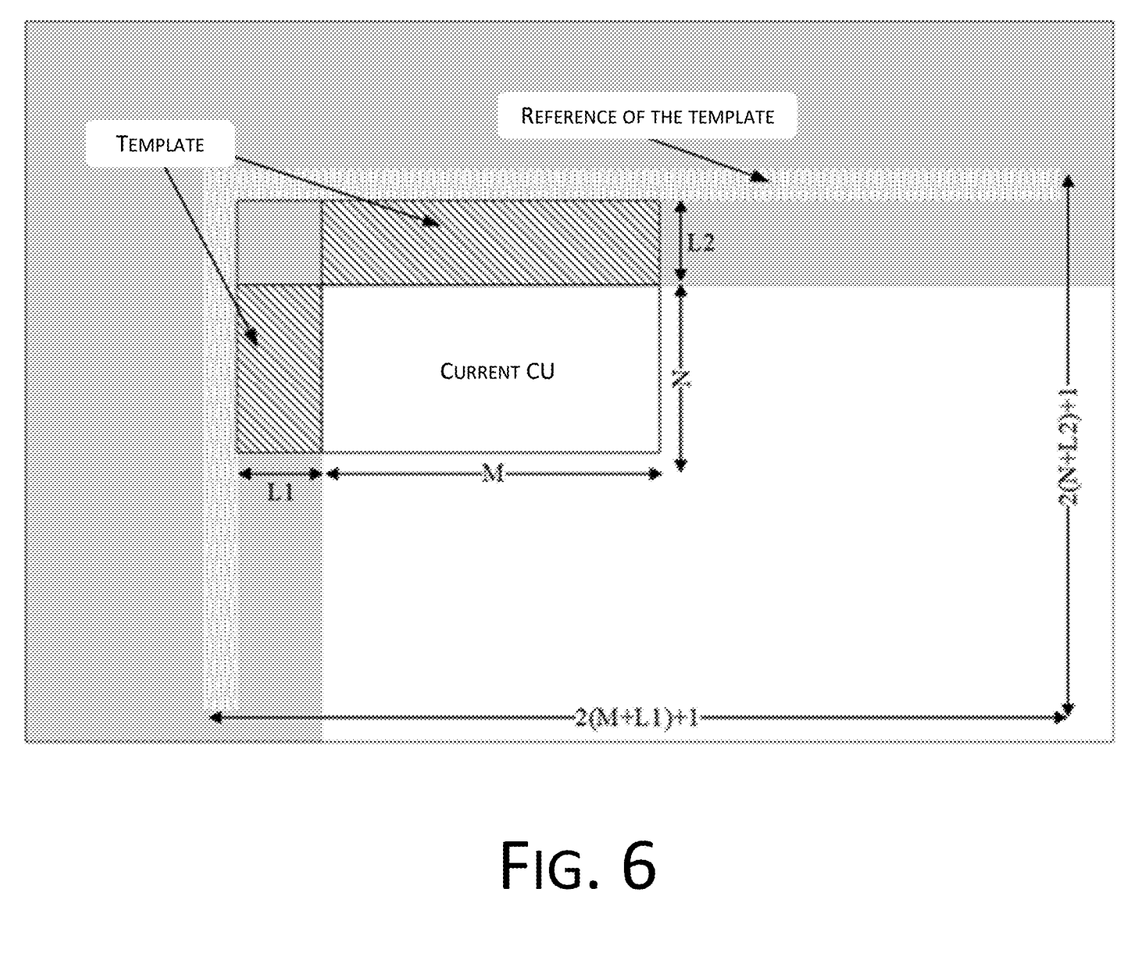
FIG. 6 illustrates an example template and example reference samples used in TIMD.

In example implementations, a decoder-side intra mode derivation method may be used in ECM. By way of example and not limitation, the decoder-side intra mode derivation method may include, but is not limited to, a template-based intra mode derivation (TIMD) method. In example implementations, the intra prediction mode of a block may be derived with a template-based method at both the encoder side and the decoder side, instead of being signaled. In example implementations, a candidate may be constructed from a MPM list and candidate modes may be a predetermined number of intra prediction modes (such as 67 intra prediction modes in VVC for example), or an extended number of intra prediction modes (such as 131 intra prediction modes for example). In example implementations, as shown in FIG. 6, prediction samples of a template are generated using reference samples of the template for each candidate mode. In example implementations, a cost may be calculated as a SATD (sum of absolute transformed differences) between predicted and reconstruction samples of the template. In example implementations, an intra prediction mode with the minimum cost may be selected as the TIMD mode and may be used for intra prediction of the current CU.

In example implementations, the TIMD mode may be used as an additional intra prediction method for a CU. A flag may be signaled in a sequence parameter set (SPS) to enable/disable the TIMD. When the flag is true, a CU level flag may be signaled to indicate whether the TIMD is used. In example implementations, a TIMD flag may be signaled right after a MIP flag. If the TIMD flag is equal to true, the remaining syntax elements related to luma intra prediction mode, including MRL, ISP, and normal parsing stage for luma intra prediction modes, may all be skipped.

In example implementations, if the number of intra prediction modes is extended to an extended number (such as extended to 131 for example) in the TIMD, when an intra prediction mode is stored for the current block, a predefined data structure (such as a table, a pointer list, etc.) may be used to map these extended number of modes into an original number (such as 67 using the above example) of intra prediction modes in the VVC, for example.

In example implementations, a fusion or combination of two intra prediction modes derived from the TIMD method may be used, which may be called as a TIMD fusion method. In example implementations, instead of selecting the only one mode with the smallest SATD cost, two modes with the first two smallest SATD costs obtained by the TIMD method may be selected, and predictors of these two modes may then be blended to generate a final predictor for the current block. Corresponding weights of these two modes may be set to be inversely proportional to their SATD costs.

In example implementations, another decoder-side intra mode derivation (DIMD) method may be used in ECM. In example implementations, in order to build a DIMD histogram for a block, an encoder and a decoder may perform gradient analysis on samples of an L-shaped template of a second neighboring line of samples adjacent to an upper edge and a left edge of the block. A DIMD mode may then be derived from the histogram.

In example implementations, in addition to DCT-2 which has been employed in HEVC, a Multiple Transform Selection (MTS) scheme may be used for residual coding of both inter and intra coded blocks in VVC. In example implementations, newly added transform kernels may include, for example, DCT-8 and DST-7. In example implementations, additional transform kernels including, for example, DCT-5, DST-4, DST-1, and identity transform (IDT) may also be employed. Moreover, an MTS transform kernel may be made to be dependent on a TU size and an intra prediction mode. In example implementations, a predefined number (such as 16, etc.) of different TU sizes may be considered. For each TU size, a predefined number (e.g., 3, 4, 5 etc.) of different classes may be considered depending on an intra prediction mode. For each class, different transform kernel pairs (such as 1, 4 or 6 pairs, etc.) may be considered, with each pair including transform kernels for horizontal and vertical respectively. In example implementations, a number of intra MTS candidates (such as 1, 4 and 6 MTS candidates, for example) may be adaptively selected depending on a sum of absolute values of transform coefficients.

In example implementations, a low-frequency non-separable transform (LFNST) may be applied between forward primary transform and quantization (at the encoder side) and between de-quantization and inverse primary transform (at the decoder side). In example implementations, a low-frequency non-separable transform of a predefined size (such as 4×4, or 8×8, etc.) may be applied according to the block size. By way of example and not limitation, a LFNST of a size of 4×4 may be applied for small blocks (e.g., blocks having sizes less than a predefined size), and a LFNST of a size of 8×8 may be applied for larger blocks (e.g., blocks having sizes larger than or equal to the predefined size). In example implementations, a first number (such as 4, etc.) of transform kernel sets and a second number (such as 2, for example) of non-separable transform kernels per transform set may be used in LFNST in VVC. A transform set used may be determined by an intra prediction mode of the current block. In example implementations, the number of transform kernel sets supported by LFNST may be expanded to a preset value (for example, 35).

In example implementations, as the prediction process of the planar mode, the horizontal interpolation result and the vertical interpolation result are always weighted average to generate the predicted value of the current sample, this process may not be suitable for some textures.

In example implementations, a plurality of planar modes may be provided. By way of example and not limitation, three different planar modes may be provided herein for illustration. In example implementations, the first planar mode may use or perform only horizontal linear interpolation to predict a current sample, as shown in Equation (8), which may be referred to as a planar horizontal mode herein. In example implementations, a predicted value of the current sample may be obtained from a left reference sample in the same row of the current sample rec(−1, y) and a reference sample on the top-right position adjacent to a current block including the current sample rec(W, −1). In example implementations, the second planar mode may use or perform only vertical linear interpolation to predict a current sample, as shown in Equation (9), which may be referred to as a planar vertical mode herein. In example implementations, a predicted value of the current sample may be obtained from an upper (or above) reference sample in the same column of the current sample rec(x, −1) and a reference sample on the bottom-left position adjacent to a current block including the current sample rec(−1, H). In example implementations, the third planar mode may be the current planar mode used in the VVC, which uses both horizontal linear interpolation and vertical linear interpolation to predict a current sample as shown in Equations (1)-(3), which is referred to as a planar average mode herein. In example implementations, all 4 reference samples as mentioned above may be involved in the prediction of a current sample.

$$\text{pred}(x,y) = ((W-1-x)*\text{rec}(-1,y)+(x+1)*\text{rec}(W,-1)+(W>>1))>>\log_2 W \quad (8)$$

$$\text{pred}(x,y) = ((H-1-y)*\text{rec}(x,-1)+(y+1)*\text{rec}(-1,H)+(H>>1))>>\log_2 H \quad (9)$$

In example implementations, W>>1 and H>>1 are two offsets used for rounding, which may also be represented as 1<<(log$_2$ W−1) and 1<<(log$_2$ H−1), respectively.

In example implementations, the planar horizontal mode and the planar vertical mode may be applied only to luma blocks when MRL (Multiple Reference Line), ISP (Intra Sub-Partitions), and TIMD are disabled.

In example implementations, a horizontal interpolation result and a vertical interpolation result may have different weights when weighting for planar prediction as Equation (10):

$$\text{pred}(x,y) = (wV*\text{pred}V(x,y)+wH*\text{pred}H(x,y)+(W*H*(wV+wH))>>1)>>(\log_2 W+\log_2 H+\log_2(wV+wH)) \quad (10)$$

where two intermediate values predV(x, y) and predH(x, y) are related to the horizontal interpolation result and the vertical interpolation result and can be obtained by Equation (1) and Equation (2) respectively. In example implementations, the values of two weights wV and wH can be any non-negative integers and a sum of these two values may be a power of 2. In example implementations, (W*H*(wV+wH))>>1 is an offset used for rounding, which may also be represented as 1<<($\log_2$ W+$\log_2$H+$\log_2$(wV+wH)−1).

In example implementations, different wV and wH may represent different planar modes. For example, when wV=wH, Equation (10) is the same as Equation (3), which can represent the planar average mode. When wV=0, Equation (10) is the same as Equation (8), which can represent the planar horizontal mode. When wH=0, the Equation (10) is the same as the Equation (9), which can represent the planar vertical mode.

In example implementations, different planar modes may be supported and represented by Equation (10) using different values of wV and/or wH. By way of example and not limitation, three planar modes may be supported, and may include a planar mode with wV=2 and wH=2 (the planar average mode), a planar mode with wV=1 and wH=3, and a planar mode with wV=3 and wH=1. For another example, five planar modes may be supported, and may include a planar mode with wV=2 and wH=2 (the planar average mode), a planar mode with wV=0 and wH=4 (the planar horizontal mode), a planar mode with wV=4 and wH=0 (the planar vertical mode), a planar mode with wV=1 and wH=3, and a planar mode with wV=3 and wH=1.

In example implementations, when multiple planar modes are supported, a flag may be signaled to indicate whether to use a planar mode to predict samples in a block. If the flag indicates that the block uses a planar mode, a syntax element may further be signaled to indicate which one of the supported planar modes is used. In example implementations, the syntax element may be coded by a TUC (Truncated Unary Code) or fixed length code.

For example, if three planar modes (such as the planar average mode, the planar horizontal mode and the planar vertical mode) are supported, a flag may be signaled to indicate whether a planar mode is used for a current block. If the flag is true (or indicates that a planar mode is used), a syntax element may further be signaled and coded by a TUC (Truncated Unary Code) as Table 1 below to indicate which mode is used.

TABLE 1 the binary code word by TUC of the three planar modes

| Mode | Binary Code Word by TUC |
| --- | --- |
| planar average mode | 0 |
| planar horizontal mode | 10 |
| planar vertical mode | 11 |

Additionally or alternatively, in example implementations, when multiple planar modes are supported, all the planar modes may be signaled based on a MPM list. For example, the planar average mode, the planar horizontal mode and the planar vertical mode are supported. In this case, the number of the non-angular intra prediction modes may be expanded from a first number (such as 2 in this example) to a second number (such as 4 in this example) with a third number (such as 65 in this example) of angular intra prediction modes, and a fourth number (i.e., a sum of the first number and the second number, for example, a total of 69 in this example) of intra prediction modes are supported and signaled based on a MPM list.

In example implementations, a unified k-MPM list (i.e., a MPM list with k entries) may be constructed with modification, where k is a positive integer. For example, a unified 6-MPM list may be constructed with the following modification: if both modes Left and Above are non-angular modes, the MPM list is set as {Planar average, Planar horizontal, Planar vertical, DC, V, H} or any permutation of these 6 modes.

In example implementations, a general MPM list with PMPM and SMPM lists as described above may be used or constructed with modifications. For example, a general MPM list with 22 entries may be used or constructed with the following modifications: the planar average mode is always the first entry of the MPM list, while the planar horizontal mode and the planar vertical mode are in the default mode list.

Additionally or alternatively, in example implementations, when multiple planar modes are supported, an implicit method may be used to decide or determine which of the planar modes is used for a current block, and no syntax element is signaled to indicate which one of the planar modes is used.

In example implementations, gradients of reconstructed values of samples in the adjacent row and column of a current block may be used to decide or determine which planar mode is used implicitly. By way of example and not limitation, if the planar average mode, the planar horizontal mode and the planar vertical mode are supported, a flag may be signaled to indicate whether one of the three planar modes is used for a current block. In example implementations, if the flag is true, horizontal and vertical gradients of reconstructed values for each sample in the adjacent row and column of the current block may be calculated. In example implementations, if a sum of absolute values of the horizontal gradients is greater than (or equal to) a sum of absolute values of the vertical gradients multiplied by a first predefined threshold, a determination may be made that the planar horizontal mode is used. In example implementations, if the sum of absolute values of the vertical gradients is greater than (or equal to) the sum of absolute values of the horizontal gradients multiplied by a second predefined threshold, a determination may be made that the planar vertical mode is used. Otherwise, this means that values of these two sums are close, and a determination is made that the planar average mode is used.

Additionally or alternatively, in example implementations, a template-based method may be used to decide or determine a planar mode implicitly. By way of example and not limitation, if the planar average mode, the planar horizontal mode and the planar vertical mode are supported, a flag may be signaled to indicate whether one of the three planar modes is used for a current block. In example implementations, if the flag is true, "L" shape template adjacent samples of the current block are predicted by these three planar modes respectively. SATD values between predicted values and reconstructed values of those samples may then be calculated. A planar mode with the smallest SATD value may be selected and used for the current block.

Additionally or alternatively, in example implementations, when multiple planar modes are supported, explicit and the implicit methods may be used together to decide or determine which of the planar modes is used for a current block.

In an example, the planar average mode, the planar horizontal mode and the planar vertical mode may be supported. A first flag may be signaled to indicate whether one of these three planar modes is used for a current block, if the first flag is true, a second flag is signaled to indicate whether the planar average mode or one of the planar horizontal mode and the planar vertical mode is used. If the second flag indicates that one of the planar horizontal mode and the planar vertical mode is used, horizontal and vertical gradients of reconstructed values for each sample in the adjacent row and column of the current block may be calculated. If a sum of absolute values of the horizontal gradients is greater than (or equal to) a sum of absolute values of the vertical gradients multiplied by a threshold, the planar horizontal mode may be used. Otherwise, the planar vertical mode may be used.

In example implementations, when a block is predicted by a planar horizontal mode or a planar vertical mode, a propagated mode of this block may be stored as another intra prediction mode. In example implementations, a propagated mode of a planar horizontal mode or a planar vertical mode coded block may be stored as a planar average mode. In example implementations, a propagated mode of a planar horizontal mode or a planar vertical mode coded block may be stored as a DIMD or TIMD mode. In example implementations, a propagated mode of a planar horizontal mode coded block may be stored as a horizontal mode. In example implementations, a propagated mode of a planar vertical mode coded block may be stored as a vertical mode. In example implementations, a propagated mode of a planar horizontal mode coded block may be stored as a vertical mode. In example implementations, a propagated mode of a planar vertical mode coded block may be stored as a horizontal mode. In example implementations, a propagated intra prediction mode may be used for DM mode derivation, MTS transform kernel determination, LFNST transform kernel determination and/or MPM list construction for adjacent blocks. For example, for a planar horizontal mode coded block, a vertical mode may be used for MTS transform kernel determination and LFNST transform kernel determination, and a planar average mode (the original planar mode) may be used for DM mode derivation and the MPM list construction for adjacent blocks. For a planar vertical mode coded block, a horizontal mode may be used for MTS transform kernel determination and LFNST transform kernel determination, and a planar average mode (the original planar mode) may be used for DM mode derivation and the MPM list construction for adjacent blocks.

In example implementations, predicted values of the planar horizontal mode and the planar vertical mode may be further modified by the PDPC method.

In example implementations, for both the planar horizontal mode and the planar vertical mode, the PDPC method of the planar average mode may be used. In example implementations, a value of an upper (or above) reference sample rec(x, −1) and a value of a left reference sample rec(−1, y) may be used to modified a predicted value of a current sample pred(x, y) according to Equation (4).

In example implementations, for the planar horizontal mode, only a value of a left reference sample rec(−1, y) may be used to modify a predicted value of a current sample pred(x, y) according to Equation (11). In example implementations, for the planar vertical mode, only a value of an upper (or above) reference sample rec(x, −1) may be used to modify a predicted value of a current sample pred(x, y) according to Equation (12).

$$\text{pred}'(x,y) = \text{clip}(wL*\text{rec}(-1,y)+(64-wL)*\text{pred}(x,y)+32) \\ >>6 \quad (11)$$

$$\text{pred}'(x,y) = \text{clip}(wT*\text{rec}(x,-1)+(64-wT)*\text{pred}(x,y)+32) \\ >>6 \quad (12)$$

In example implementations, for the planar horizontal mode, only a value of an upper (or above) reference sample rec(x, −1) may be used to modify a predicted value of a current sample pred(x, y) according to Equation (12). In example implementations, for the planar vertical mode, only a value of a left reference sample rec(−1, y) may be used to modify a predicted value of a current sample pred(x, y) according to Equation (11).

In example implementations, the planar horizontal mode and the planar vertical mode may be applied to chroma blocks. For example, when a DM mode is used for a current chroma block and an intra prediction mode of a collocated luma block is a planar horizontal mode or a planar vertical mode, such mode may also be used for the chroma block.

In example implementations, the planar horizontal mode and the planar vertical cannot be applied to chroma blocks. In this case, when a DM mode is used for a current chroma block and an intra prediction mode of a collocated luma block is a planar horizontal mode or a planar vertical mode, a planar average mode may be used for the chroma block.

In example implementations, the planar horizontal mode and the planar vertical mode may be put into a TIMD mode list. For example, these two modes may always be in the TIMD mode list.

In example implementations, the planar horizontal mode and the planar vertical mode may be applied when ISP is enabled to the current block.

The aforementioned embodiments can be combined freely.

For example, an input video or video stream may be obtained or received. The input video or video stream may include a plurality of video frames, and each frame may be divided into a plurality of blocks. In example implementations, a current block may be predicted using a planar mode. In example implementations, the planar mode may be determined from among multiple planar modes, wherein the multiple planar modes may include, but are not limited to, a planar horizontal mode, a planar vertical mode, and a planar average mode, etc.

In example implementations, depending on which planar mode is used, different reference samples may be used for predicting a current sample in the current block. For example, when predicting a current sample in the current block using the planar horizontal mode, only a left reference sample and an upper right reference sample are used. When predicting a current sample using the planar vertical mode, only an upper reference sample and a bottom left reference sample are used. When predicting a current sample using the planar average mode, the left reference sample, the upper right reference sample, the upper reference sample and the bottom left reference sample are used.

Additionally or alternatively, only a horizontal linear interpolation may be used when predicting a current sample in the current block using the planar horizontal mode. In example implementations, only a vertical linear interpolation may be used when predicting the current sample using the planar vertical mode. In example implementations, the horizontal linear interpolation and the vertical linear interpolation may be used when predicting the current sample using the planar average mode. In example implementations, a horizontal interpolation result and a vertical interpolation result are associated with different weights when weighting is applied for planar prediction.

In example implementations, the planar horizontal mode and the planar vertical mode may be applicable only to luma blocks when one or more of Multiple Reference Line (MRL), Intra Sub-Partitions (ISP), and Template-based Intra Mode Derivation (TIMD) are disabled.

In example implementations, an encoder may encode a flag and a syntax element in the input video or video bitstream during an encoding process. In example implementations, the flag may be used to indicate whether to use a planar mode to predict samples in a current block of the input video or video bitstream when multiple planar modes are supported. In example implementations, the syntax element may be used to indicate which one of the multiple planar modes is used when the flag indicates that the planar mode is used for the current block in the input video or video bitstream. In example implementations, in response to receiving the input video or video bitstream, a decoder may decode the flag and the syntax element during a decoding process. In example implementations, the syntax element may be coded by a truncated unary code or a fixed length code.

Additionally or alternatively, in example implementations, the encoder may encode a flag in the input video or video bitstream, and use the flag to indicate which planar mode of multiple planar modes based at least in part on a MPM list when multiple planar modes are supported. In example implementations, the decoder may decode the flag in the input video or video bitstream to determine which planar mode of multiple planar modes is used for the current block. Additionally or alternatively, in example implementations, the decoder may use an implicit method to determine which planar mode is used for the current block when multiple planar modes are supported.

One skilled in the art will appreciate that all of the above aspects of the present disclosure may be implemented concurrently in any combination thereof, and all aspects of the present disclosure may be implemented in combination as yet another embodiment of the present disclosure.

Figure 7:
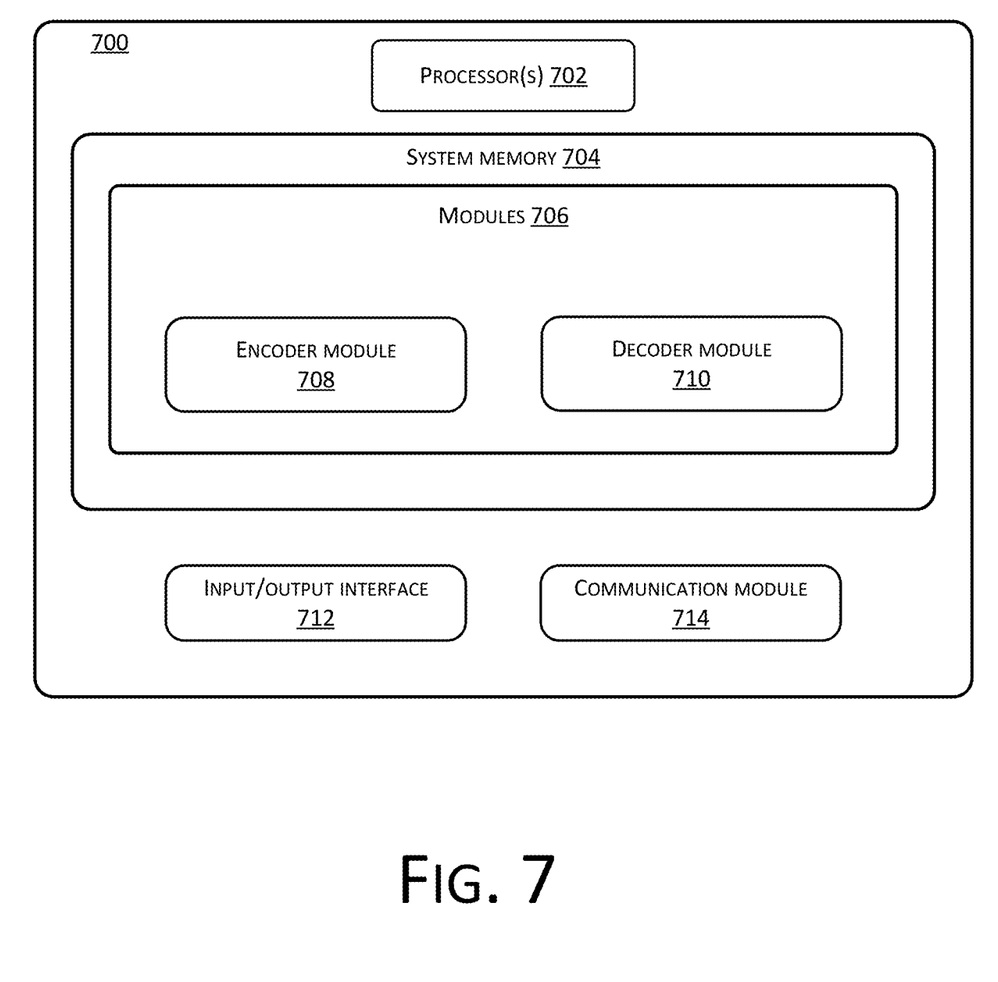
FIG. 7 illustrates an example system for implementing the above-described processes and methods that implement a planar intra prediction mode.

FIG. 7 illustrates an example system 700 for implementing the processes and methods described above for implementing a planar intra prediction mode.

The techniques and mechanisms described herein may be implemented by multiple instances of the system 700 as well as by any other computing device, system, and/or environment. The system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 700 may include one or more processors 702 and system memory 704 communicatively coupled to the processor(s) 702. The processor(s) 702 may execute one or more modules and/or processes to cause the processor(s) 702 to perform a variety of functions. In some embodiments, the processor(s) 702 may include a central processing unit ("CPU"), a graphics processing unit ("GPU"), both CPU and GPU, or other processing units or components known in the art. Additionally, each of the processor(s) 702 may possess its own local memory, which also may store program modules, program data, and/or one or more operating systems.

Depending on the exact configuration and type of the system 700, the system memory 704 may be volatile, such as RAM, non-volatile, such as ROM, flash memory, miniature hard drive, memory card, and the like, or some combination thereof. The system memory 704 may include one or more computer-executable modules 806 that are executable by the processor(s) 702.

The modules 706 may include, but are not limited to, an encoder module 708 and a decoder module 710.

The encoder module 708 may be configured to perform prediction coding upon frames from a video source, and to signal flags in a bitstream by any of the methods described above.

The decoder module 710 may be configured to perform prediction coding upon frames from a video source, and to derive prediction modes (such as inter prediction modes, intra prediction modes, etc.) by any of the methods described above.

The system 700 may additionally include an input/output (I/O) interface 712 for receiving video source data and bitstream data, and for outputting decoded frames into a reference frame buffer and/or a display buffer. The system 700 may also include a communication module 714 allowing the system 700 to communicate with other devices (not shown) over a network (not shown). The network may include the Internet, wired media such as a wired network or direct-wired connections, and wireless media such as acoustic, radio frequency ("RF"), infrared, and other wireless media.

Some or all operations of the methods described above can be performed by execution of computer readable instructions stored on a computer readable storage medium, as defined below. The term "computer readable instructions" as used in the description and claims, include routines, applications, application modules, program modules, programs, components, data structures, algorithms, and the like. Computer readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer readable storage media may include volatile memory (such as random-access memory ("RAM")) and/or non-volatile memory (such as read-only memory ("ROM"), flash memory, etc.). The computer readable storage media may also include additional removable storage and/or non-removable storage including, but not limited to, flash memory, magnetic storage, optical storage, and/or tape storage that may provide non-volatile storage of computer readable instructions, data structures, program modules, and the like.

A non-transient computer readable storage medium is an example of computer readable media. Computer readable media includes at least two types of computer readable media, namely computer readable storage media and communications media. Computer readable storage media includes volatile and non-volatile, removable and non-removable media implemented in any process or technology for storage of information such as computer readable instructions, data structures, program modules, or other data. Computer readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. A computer readable storage medium employed herein shall not be interpreted as a transitory signal itself, such as a radio wave or other free-propagating electromagnetic wave, electromagnetic waves propagating through a waveguide or other transmission medium (such as light pulses through a fiber optic cable), or electrical signals propagating through a wire.

The computer readable instructions stored on one or more non-transitory computer readable storage media that, when executed by one or more processors, may perform operations described above with reference to FIGS. 1-6. Generally, computer readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The present disclosure can be further understood using the following clauses.

Clause 1: A method comprising: predicting a current block using a planar mode, wherein the planar mode comprising: a planar horizontal mode, a planar vertical mode, or a planar average mode.

Clause 2: The method of Clause 1, further comprising: determining the planar mode from among multiple planar modes, wherein the multiple planar modes comprise at least the planar horizontal mode, the planar vertical mode, and the planar average mode.

Clause 3: The method of Clause 1, further comprising: using only a left reference sample and an upper right reference sample when predicting a current sample in the current block using the planar horizontal mode; using only an upper reference sample and a bottom left reference sample when predicting the current sample using the planar vertical mode; and using the left reference sample, the upper right reference sample, the upper reference sample and the bottom left reference sample when predicting the current sample using the planar average mode.

Clause 4: The method of Clause 1, further comprising: using only a horizontal linear interpolation when predicting a current sample in the current block using the planar horizontal mode; using only a vertical linear interpolation when predicting the current sample using the planar vertical mode; and using the horizontal linear interpolation and the vertical linear interpolation when predicting the current sample using the planar average mode.

Clause 5: The method of Clause 1, wherein the planar horizontal mode and the planar vertical mode are applicable only to luma blocks when one or more of Multiple Reference Line (MRL), Intra Sub-Partitions (ISP), and Template-based Intra Mode Derivation (TIMD) are disabled.

Clause 6: The method of Clause 1, wherein a horizontal interpolation result and a vertical interpolation result are associated with different weights when weighting is applied for planar prediction.

Clause 7: The method of Clause 1, further comprising: encoding or decoding a flag in a bitstream to indicate whether to use the planar mode to predict samples in the current block when multiple planar modes are supported, the multiple planar modes comprising at least the planar horizontal mode, the planar vertical mode, and the planar average mode; and encoding or decoding a syntax element in the bitstream to indicate which one of the multiple planar modes is used when the flag indicates that the planar mode is used for the current block, wherein the syntax element is coded by a truncated unary code or a fixed length code.

Clause 8: The method of Clause 1, further comprising: using a flag to indicate which planar mode of multiple planar modes based at least in part on a MPM list when the multiple planar modes are supported; or using an implicit method to determine which planar mode is used for the current block when the multiple planar modes are supported.

Clause 9: One or more computer readable media storing executable instructions that, when executed by one or more processors, cause the one or more processors to perform acts comprising: predicting a current block using a planar mode, wherein the planar mode comprising: a planar horizontal mode, a planar vertical mode, or a planar average mode.

Clause 10: The one or more computer readable media of Clause 9, the acts further comprising: determining the planar mode from among multiple planar modes, wherein the multiple planar modes comprise at least the planar horizontal mode, the planar vertical mode, and the planar average mode.

Clause 11: The one or more computer readable media of Clause 9, the acts further comprising: using only a left reference sample and an upper right reference sample when predicting a current sample in the current block using the planar horizontal mode; using only an upper reference sample and a bottom left reference sample when predicting the current sample using the planar vertical mode; and using the left reference sample, the upper right reference sample, the upper reference sample and the bottom left reference sample when predicting the current sample using the planar average mode.

Clause 12: The one or more computer readable media of Clause 9, the acts further comprising: using only a horizontal linear interpolation when predicting a current sample in the current block using the planar horizontal mode; using only a vertical linear interpolation when predicting the current sample using the planar vertical mode; and using the horizontal linear interpolation and the vertical linear interpolation when predicting the current sample using the planar average mode.

Clause 13: The one or more computer readable media of Clause 9, wherein the planar horizontal mode and the planar vertical mode are applicable only to luma blocks when one or more of Multiple Reference Line (MRL), Intra Sub-Partitions (ISP), and Template-based Intra Mode Derivation (TIMD) are disabled.

Clause 14: The one or more computer readable media of Clause 9, wherein a horizontal interpolation result and a vertical interpolation result are associated with different weights when weighting is applied for planar prediction.

Clause 15: The one or more computer readable media of Clause 9, the acts further comprising: encoding or decoding a flag in a bitstream to indicate whether to use the planar mode to predict samples in the current block when multiple planar modes are supported, the multiple planar modes comprising at least the planar horizontal mode, the planar vertical mode, and the planar average mode; and encoding or decoding a syntax element in the bitstream to indicate which one of the multiple planar modes is used when the flag indicates that the planar mode is used for the current block, wherein the syntax element is coded by a truncated unary code or a fixed length code.

Clause 16: The one or more computer readable media of Clause 9, the acts further comprising: using a flag to indicate which planar mode of multiple planar modes based at least in part on a MPM list when the multiple planar modes are supported; or using an implicit method to determine which planar mode is used for the current block when the multiple planar modes are supported.

Clause 17: A system comprising: one or more processors; and memory storing executable instructions that, when executed by the one or more processors, cause the one or more processors to perform acts comprising: predicting a current block using a planar mode, wherein the planar mode comprising: a planar horizontal mode, a planar vertical mode, or a planar average mode.

Clause 18: The system of Clause 17, the acts further comprising: using only a left reference sample and an upper right reference sample when predicting a current sample in the current block using the planar horizontal mode; using only an upper reference sample and a bottom left reference sample when predicting the current sample using the planar vertical mode; and using the left reference sample, the upper right reference sample, the upper reference sample and the bottom left reference sample when predicting the current sample using the planar average mode.

Clause 19: The system of Clause 17, the acts further comprising: using only a horizontal linear interpolation when predicting a current sample in the current block using the planar horizontal mode; using only a vertical linear interpolation when predicting the current sample using the planar vertical mode; and using the horizontal linear interpolation and the vertical linear interpolation when predicting the current sample using the planar average mode.

Clause 20: The system of Clause 17, the acts further comprising: encoding or decoding a flag in a bitstream to indicate whether to use the planar mode to predict samples in the current block when multiple planar modes are supported, the multiple planar modes comprising at least the planar horizontal mode, the planar vertical mode, and the planar average mode; and encoding or decoding a syntax element in the bitstream to indicate which one of the multiple planar modes is used when the flag indicates that the planar mode is used for the current block, wherein the syntax element is coded by a truncated unary code or a fixed length code.

What is claimed is:

1. A method comprising:
   predicting a current block using a planar mode, wherein:
   the planar mode comprises: a planar horizontal mode, a planar vertical mode, or a planar average mode; and
   the planar mode is determined for the current block based at least in part on a comparison involving a ratio between a sum of absolute values of vertical gradients associated with the current block and a sum of absolute values of horizontal gradients associated with the current block, and at least one of a first predefined threshold or a second predefined threshold.

2. The method of claim 1, further comprising:
   determining the planar mode from among multiple planar modes, wherein the multiple planar modes comprise at least the planar horizontal mode, the planar vertical mode, and the planar average mode.

3. The method of claim 1, further comprising:
   using only a left reference sample and an upper right reference sample when predicting a current sample in the current block using the planar horizontal mode;
   using only an upper reference sample and a bottom left reference sample when predicting the current sample using the planar vertical mode; and
   using the left reference sample, the upper right reference sample, the upper reference sample and the bottom left reference sample when predicting the current sample using the planar average mode.

4. The method of claim 1, further comprising:
   using only a horizontal linear interpolation when predicting a current sample in the current block using the planar horizontal mode;
   using only a vertical linear interpolation when predicting the current sample using the planar vertical mode; and
   using the horizontal linear interpolation and the vertical linear interpolation when predicting the current sample using the planar average mode.

5. The method of claim 1, wherein the planar horizontal mode and the planar vertical mode are applicable only to luma blocks when one or more of Multiple Reference Line (MRL), Intra Sub-Partitions (ISP), and Template-based Intra Mode Derivation (TIMD) are disabled.

6. The method of claim 1, wherein a horizontal interpolation result and a vertical interpolation result are associated with different weights when weighting is applied for planar prediction.

7. The method of claim 1, further comprising:
   encoding or decoding a flag in a bitstream to indicate whether to use the planar mode to predict samples in the current block when multiple planar modes are supported, the multiple planar modes comprising at least the planar horizontal mode, the planar vertical mode, and the planar average mode; and
   encoding or decoding a syntax element in the bitstream to indicate which one of the multiple planar modes is used when the flag indicates that the planar mode is used for the current block, wherein the syntax element is coded by a truncated unary code or a fixed length code.

8. The method of claim 1, further comprising:
   using a flag to indicate which planar mode of multiple planar modes based at least in part on a MPM list when the multiple planar modes are supported; or
   using an implicit method to determine which planar mode is used for the current block when the multiple planar modes are supported.

9. One or more non-transitory computer readable media storing executable instructions that, when executed by one or more processors, cause the one or more processors to perform acts comprising:
   predicting a current block using a planar mode, wherein:
   the planar mode comprises: a planar horizontal mode, a planar vertical mode, or a planar average mode; and the planar mode is determined for the current block based at least in part on a comparison involving a ratio between a sum of absolute values of vertical gradients associated with the current block and a sum of absolute values of horizontal gradients associated with the current block, and at least one of a first predefined threshold or a second predefined threshold.

10. The one or more non-transitory computer readable media of claim 9, the acts further comprising:
determining the planar mode from among multiple planar modes, wherein the multiple planar modes comprise at least the planar horizontal mode, the planar vertical mode, and the planar average mode.

11. The one or more non-transitory computer readable media of claim 9, the acts further comprising:
using only a left reference sample and an upper right reference sample when predicting a current sample in the current block using the planar horizontal mode;
using only an upper reference sample and a bottom left reference sample when predicting the current sample using the planar vertical mode; and
using the left reference sample, the upper right reference sample, the upper reference sample and the bottom left reference sample when predicting the current sample using the planar average mode.

12. The one or more non-transitory computer readable media of claim 9, the acts further comprising:
using only a horizontal linear interpolation when predicting a current sample in the current block using the planar horizontal mode;
using only a vertical linear interpolation when predicting the current sample using the planar vertical mode; and
using the horizontal linear interpolation and the vertical linear interpolation when predicting the current sample using the planar average mode.

13. The one or more non-transitory computer readable media of claim 9, wherein the planar horizontal mode and the planar vertical mode are applicable only to luma blocks when one or more of Multiple Reference Line (MRL), Intra Sub-Partitions (ISP), and Template-based Intra Mode Derivation (TIMD) are disabled.

14. The one or more non-transitory computer readable media of claim 9, wherein a horizontal interpolation result and a vertical interpolation result are associated with different weights when weighting is applied for planar prediction.

15. The one or more non-transitory computer readable media of claim 9, the acts further comprising:
encoding or decoding a flag in a bitstream to indicate whether to use the planar mode to predict samples in the current block when multiple planar modes are supported, the multiple planar modes comprising at least the planar horizontal mode, the planar vertical mode, and the planar average mode; and
encoding or decoding a syntax element in the bitstream to indicate which one of the multiple planar modes is used when the flag indicates that the planar mode is used for the current block, wherein the syntax element is coded by a truncated unary code or a fixed length code.

16. The one or more non-transitory computer readable media of claim 9, the acts further comprising:
using a flag to indicate which planar mode of multiple planar modes based at least in part on a MPM list when the multiple planar modes are supported; or
using an implicit method to determine which planar mode is used for the current block when the multiple planar modes are supported.

17. A system comprising:
one or more processors; and
memory storing executable instructions that, when executed by the one or more processors, cause the one or more processors to perform acts comprising:
predicting a current block using a planar mode, wherein:
the planar mode comprises: a planar horizontal mode, a planar vertical mode, or a planar average mode; and
the planar mode is determined for the current block based at least in part on a comparison involving a ratio between a sum of absolute values of vertical gradients associated with the current block and a sum of absolute values of horizontal gradients associated with the current block, and at least one of a first predefined threshold or a second predefined threshold.

18. The system of claim 17, the acts further comprising:
using only a left reference sample and an upper right reference sample when predicting a current sample in the current block using the planar horizontal mode;
using only an upper reference sample and a bottom left reference sample when predicting the current sample using the planar vertical mode; and
using the left reference sample, the upper right reference sample, the upper reference sample and the bottom left reference sample when predicting the current sample using the planar average mode.

19. The system of claim 17, the acts further comprising:
using only a horizontal linear interpolation when predicting a current sample in the current block using the planar horizontal mode;
using only a vertical linear interpolation when predicting the current sample using the planar vertical mode; and
using the horizontal linear interpolation and the vertical linear interpolation when predicting the current sample using the planar average mode.

20. The system of claim 17, the acts further comprising:
encoding or decoding a flag in a bitstream to indicate whether to use the planar mode to predict samples in the current block when multiple planar modes are supported, the multiple planar modes comprising at least the planar horizontal mode, the planar vertical mode, and the planar average mode; and
encoding or decoding a syntax element in the bitstream to indicate which one of the multiple planar modes is used when the flag indicates that the planar mode is used for the current block, wherein the syntax element is coded by a truncated unary code or a fixed length code.

* * * * *